(12) United States Patent
Sharma et al.

(10) Patent No.: US 11,676,370 B2
(45) Date of Patent: Jun. 13, 2023

(54) SELF-SUPERVISED CROSS-VIDEO TEMPORAL DIFFERENCE LEARNING FOR UNSUPERVISED DOMAIN ADAPTATION

(71) Applicant: NEC Laboratories America, Inc., Princeton, NJ (US)

(72) Inventors: Gaurav Sharma, Newark, CA (US); Jinwoo Choi, Blacksburg, VA (US)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 17/317,202

(22) Filed: May 11, 2021

(65) Prior Publication Data

US 2021/0374481 A1 Dec. 2, 2021

Related U.S. Application Data (60) Provisional application No. 63/030,336, filed on May 27, 2020.

(51) Int. Cl.
*G06V 10/764* (2022.01)
*G06N 3/08* (2023.01)
(Continued)

(52) U.S. Cl.
CPC .......... *G06V 10/765* (2022.01); *G06F 18/211* (2023.01); *G06F 18/217* (2023.01);
(Continued)

(58) Field of Classification Search
CPC ...... G06V 10/765; G06V 20/49; G06V 20/46; G06V 10/764; G06V 10/7753; G06F 18/253; G06F 18/211; G06F 18/217; G06F 18/24; G06F 18/2155; G06N 3/04; G06N 3/08
See application file for complete search history.

(56) References Cited

U.S. PATENT DOCUMENTS 11,138,441 B2 * 10/2021 Li ................... G06V 10/7753
11,403,850 B2 * 8/2022 Chen ................. G06N 3/045
(Continued)

OTHER PUBLICATIONS

Jamal, Arshad, et al. "Deep Domain Adaptation in Action Space." BMVC. Vol. 2. No. 3. 2018. (Year: 2018).*
(Continued)

*Primary Examiner* — Utpal D Shah
(74) *Attorney, Agent, or Firm* — Joseph Kolodka (57) ABSTRACT

A method is provided for Cross Video Temporal Difference (CVTD) learning. The method adapts a source domain video to a target domain video using a CVTD loss. The source domain video is annotated, and the target domain video is unannotated. The CVTD loss is computed by quantizing clips derived from the source and target domain videos by dividing the source domain video into source domain clips and the target domain video into target domain clips. The CVTD loss is further computed by sampling two clips from each of the source domain clips and the target domain clips to obtain four sampled clips including a first source domain clip, a second source domain clip, a first target domain clip, and a second target domain clip. The CVTD loss is computed as |(second source domain clip−first source domain clip)−(second target domain clip−first target domain clip)|.

20 Claims, 7 Drawing Sheets

(51) Int. Cl.
    G06N 3/04       (2023.01)
    G06V 20/40      (2022.01)
    G06V 10/774     (2022.01)
    G06F 18/21      (2023.01)
    G06F 18/24      (2023.01)
    G06F 18/211     (2023.01)
    G06F 18/25      (2023.01)
    G06F 18/214     (2023.01)

(52) U.S. Cl.
    CPC .......... *G06F 18/2155* (2023.01); *G06F 18/24* (2023.01); *G06F 18/253* (2023.01); *G06N 3/04* (2013.01); *G06N 3/08* (2013.01); *G06V 10/764* (2022.01); *G06V 10/7753* (2022.01); *G06V 20/46* (2022.01); *G06V 20/49* (2022.01)

(56) References Cited

U.S. PATENT DOCUMENTS

| | | | |
|---|---|---|---|
| 11,580,743 B2* | 2/2023 | Chen | G06N 3/08 |
| 2018/0268265 A1* | 9/2018 | Sohn | G06F 18/24143 |
| 2018/0268266 A1* | 9/2018 | Sohn | G06V 30/19173 |
| 2020/0134424 A1* | 4/2020 | Chen | G06N 3/045 |
| 2020/0151457 A1* | 5/2020 | Sharma | G06V 10/267 |
| 2020/0401938 A1* | 12/2020 | Etkin | G16H 50/30 |
| 2021/0064883 A1* | 3/2021 | Sharma | G06V 10/7753 |
| 2021/0174093 A1* | 6/2021 | Li | G06F 18/217 |
| 2021/0334664 A1* | 10/2021 | Li | G06N 20/00 |

OTHER PUBLICATIONS

Jinwoo Choi et al., Unsupervised and Semi-Supervised Domain Adaptation for Action Recognition from Drones:, 2020 IEEE Winter Conference on Applications of Computer Vision (WACV), May 14, 2020, pp. 1706-1708; and figure 2.

Joe, Yue-Hei Ng et al., "Temporal Difference Networks for Video Action Recognition", 2018 IEEE Winter Conference an Applications of Computer Vision (WACV), May 7, 2018, pp. 1588-1590, 1593; and figures 1-2.

Chen, Min-Hung, et al., "Temporal Attentive Alignment for Large-Scale Video Domain Adaptation", In Proceedings of the IEEE/CVF International Conference on Computer Vision. Oct. 2019, pp. 6321-6330.

Choi, Jinwoo, et al., "Unsupervised and Semi-Supervised Domain Adaptation for Action Recognition from Drones", In Proceedings of the IEEE/CVF Winter Conference on Applications of Computer Vision. Mar. 2020, pp. 1717-1726.

Munro, Jonahan, et al., "Multi-Modal Domain Adaptation for Fine-Grained Action Recognition", In Proceedings of the IEEE/CVF Conference on Computer Vision and Pattern Recognition. Jun. 2020, pp. 122-132.

Choi, Jinwoo, et al., "Shuffle and Attend: Video Aomain Adaptation", In European Conference on Computer Vision, Springer, Cham. Aug. 23, 2020, pp. 1-17.

* cited by examiner

SELF-SUPERVISED CROSS-VIDEO TEMPORAL DIFFERENCE LEARNING FOR UNSUPERVISED DOMAIN ADAPTATION

RELATED APPLICATION INFORMATION

This application claims priority to U.S. Provisional Patent Application No. 63/030,336, filed on May 27, 2020, incorporated herein by reference in its entirety.

BACKGROUND

Technical Field

The present invention relates to artificial intelligence and more particularly to self-supervised cross-video temporal difference learning for unsupervised domain adaptation.

Description of the Related Art

Domain adaptation is the ability to apply an algorithm trained in one or more "source domains" to a different (but related) "target domain". Domain adaptation is a subcategory of transfer learning. While domain adaptation for images is a widely studied problem, domain adaptation for videos is relatively unexplored.

SUMMARY

According to aspects of the present invention, a computer-implemented method is provided for Cross Video Temporal Difference (CVTD) learning for unsupervised domain adaptation. The method includes adapting a source domain video to a target domain video using a CVTD loss. The source domain video is annotated, and the target domain video is unannotated. The CVTD loss is computed by quantizing clips derived from the source domain video and the target domain video by dividing the source domain video into a plurality of source domain clips and the target domain video into a plurality of target domain clips. The CVTD loss is further computed by sampling two clips from each of the plurality of source domain clips and the plurality of target domain clips to obtain four sampled clips including a first sampled source domain clip, a second sampled source domain clip, a first sampled target domain clip, and a second sampled target domain clip. The CVTD loss is computed by a clip encoder convolutional neural network as |(second sampled source domain clip−first sampled source domain clip)−(second sampled target domain clip−first sampled target domain clip)|.

According to other aspects of the present invention, a computer program product is provided for Cross Video Temporal Difference (CVTD) learning for unsupervised domain adaptation. The computer program product includes a non-transitory computer readable storage medium having program instructions embodied therewith. The program instructions are executable by a computer to cause the computer to perform a method. The method includes adapting a source domain video to a target domain video using a CVTD loss. The source domain video is annotated, and the target domain video is unannotated. The CVTD loss is computed by quantizing clips derived from the source domain video and the target domain video by dividing the source domain video into a plurality of source domain clips and the target domain video into a plurality of target domain clips. The CVTD loss is further computed by sampling two clips from each of the plurality of source domain clips and the plurality of target domain clips to obtain four sampled clips including a first sampled source domain clip, a second sampled source domain clip, a first sampled target domain clip, and a second sampled target domain clip. The CVTD loss is computed by a clip encoder convolutional neural network as |(second sampled source domain clip−first sampled source domain clip)−(second sampled target domain clip−first sampled target domain clip)|.

According to yet other aspects of the present invention, a computer processing system is provided for Cross Video Temporal Difference (CVTD) learning for unsupervised domain adaptation. The computer processing system includes a memory device for storing program code. The computer processing system further includes a hardware processor operatively coupled to the memory device for running the program code to adapt a source domain video to a target domain video using a CVTD loss. The source domain video is annotated, and the target domain video is unannotated. The hardware processor computes the CVTD loss by quantizing clips derived from the source domain video and the target domain video by dividing the source domain video into a plurality of source domain clips and the target domain video into a plurality of target domain clips. The hardware processor further computes the CVTD loss by sampling two clips from each of the plurality of source domain clips and the plurality of target domain clips to obtain four sampled clips including a first sampled source domain clip, a second sampled source domain clip, a first sampled target domain clip, and a second sampled target domain clip. The hardware processor, using a clip encoder convolutional neural network, also computes the CVTD loss as |(second sampled source domain clip−first sampled source domain clip)−(second sampled target domain clip−first sampled target domain clip)|.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to self-supervised cross-video temporal difference learning for unsupervised domain adaptation.

Embodiments of the present invention address the problem of video domain adaptation for classification and tagging using machine learning. The setting is that there exists a set of videos with labels (e.g., playing football, jumping, running, etc.) from a source domain (e.g., third person videos), and a set of unlabeled videos from a target domain (e.g., first person videos) for training the models and, at test time, it is expected to predict relevant labels for unseen target videos. Such settings are quite common as there may exist large amounts of annotation for one domain of videos, while only unlabeled videos in another domain where classification is to be performed.

Specific examples of usage of such systems include the following.

Smart video surveillance systems can use the method to train systems on new deployments where labeled data is not available, but collecting unlabeled data is feasible. In such cases the unlabeled data is used from the new domain, along with large, labeled data already available from existing videos in the source domain.

Drone video classification: similar to the case above, three may exist a large amount of annotated normal videos (taken from ground level) and unlabeled videos from drones. The system can then be used to learn the classification for the drone videos.

Embodiments of the present invention use a novel self-supervised loss for domain adaptation. The self-supervised loss is obtained by exploiting the temporal nature of the video which leads to sampled clips having a temporal distance between them. This loss does not require annotation, neither for source videos nor for target videos. This self-supervised loss is used along with source classification loss to perform domain adaptation. In addition, domain adversarial loss can also be used to improve results in some settings.

Figure 1:
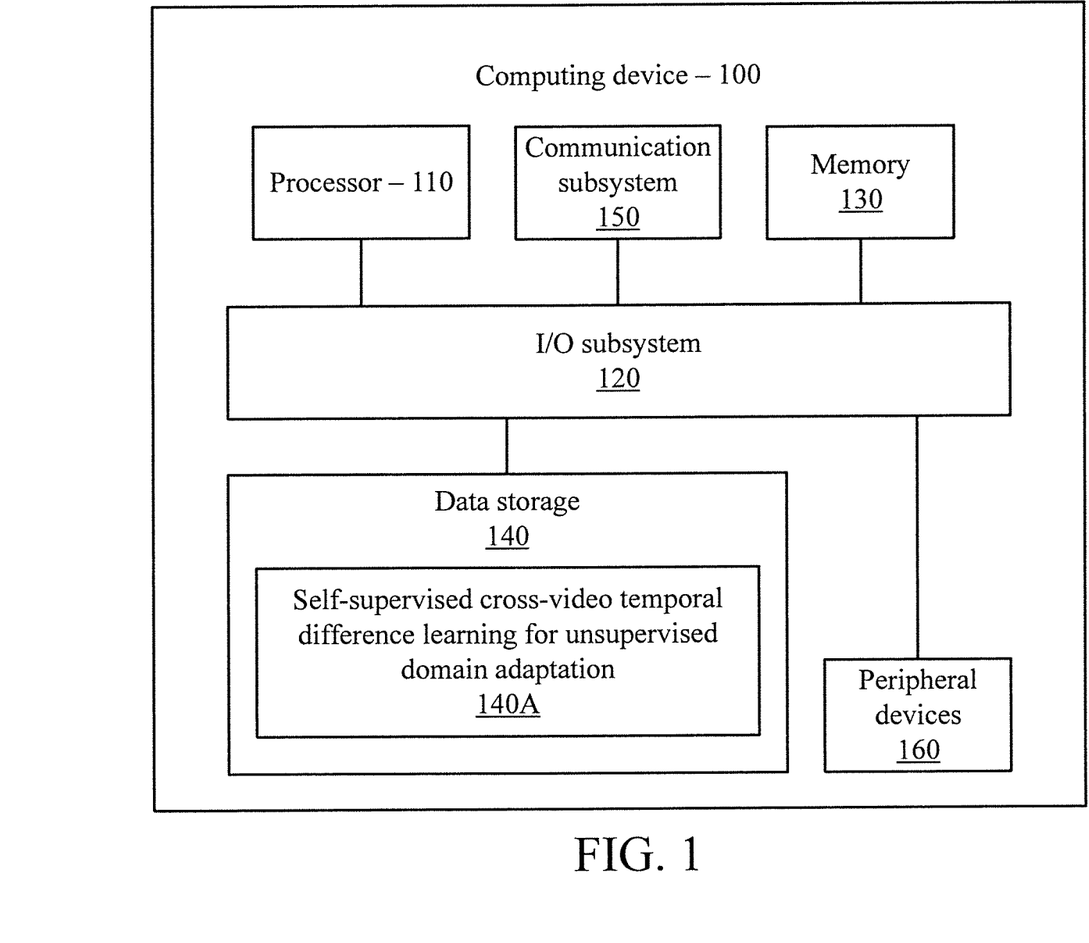
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 may be the domain adaptation system 230 of FIG. 2. The computing device 100 is configured to perform self-supervised cross-video temporal difference learning for unsupervised domain adaptation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for self-supervised cross-video temporal difference learning for unsupervised domain adaptation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
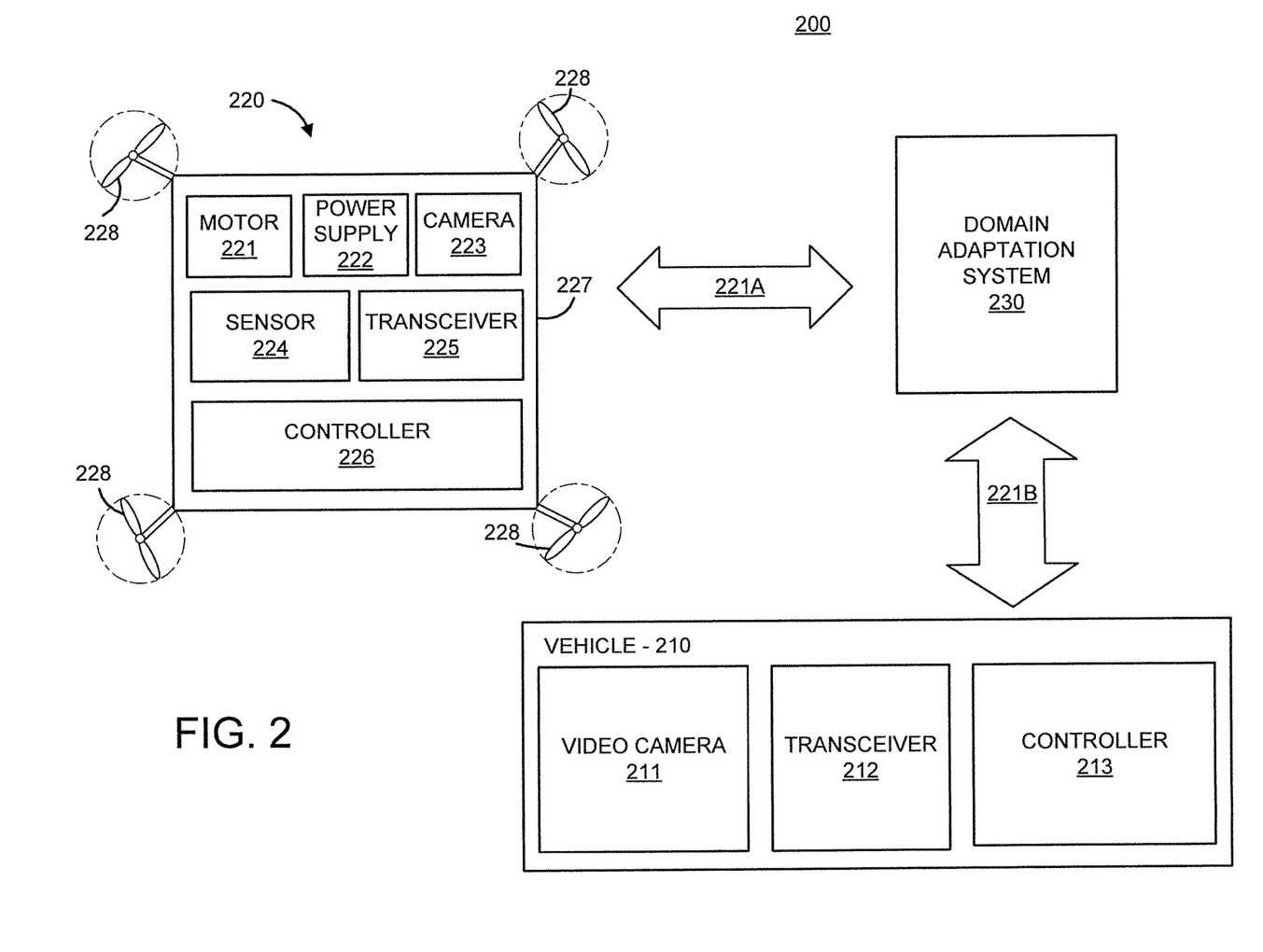
FIG. 2 is a block diagram showing an exemplary environment, in accordance with an embodiment of the present invention.

These and other variations of a hardware processor subsystem are also contemplated in accordance with embodiments of the present invention FIG. 2 is a block diagram showing an exemplary environment 200, in accordance with an embodiment of the present invention.

The environment 200 includes a ground-based motor vehicle (hereinafter "vehicle") 210 for taking annotated images in a source domain. The vehicle can be autonomous, partially autonomous, or operated by a human. The environment 200 further includes an air-based drone (hereinafter "drone") 220 for taking unannotated images in a target domain. The environment 200 also includes a domain adaptation system 230 for adapting source domain videos (from the vehicle 210) to target domain videos (from the drone 220).

In an embodiment, the drone 220 and the vehicle 210 may be configured to communicate with a domain adaptation system 230 to provide domain adaptation services. These services may include, but are not limited to, domain adaptation from a source domain (vehicle 210, ground based) to a target domain (drone 220, aerial).

The drone 220 may include a housing unit 227, at least one movement mechanism 228, and a motor 221 (e.g., internal combustion engine, electronic motor, etc.). The components of the drone 220 may be affixed on the outside of the housing unit 227, or alternatively, may be enclosed within the housing unit 227 of the drone 220.

In some embodiments, the at least one movement mechanism 228 may include a single propeller, a plurality of propellers, a propulsion mechanism, or similarly functioning devices. In one embodiment, the at least one movement mechanism may be powered by at least one motor 221 (e.g., internal combustion engine, electric motor, etc.) and a power supply 222 to provide movement for the unmanned aerial vehicle. The power supply 222 may include a battery, such as a rechargeable battery, wind-charged battery and/or solar powered battery sufficient for powering the drone 220 and/or components of the drone 220.

In one embodiment, the movement mechanism 228 and/or motor 221 provides aerial movement for the drone 220 in multiple degrees of freedom. Multiple degrees of freedom generally refers to the ability for the drone to move in a three-dimensional space.

The drone 220 may further include at least one video camera 223. In an embodiment, the video camera 223 may be configured to provide visual feedback of obstacles in the path of the drone 220 for any purpose, such as, but not limited to, navigation guidance to the drone 220 and video capture. It should be understood that various types of video cameras are contemplated, including night-vision enabled video cameras, infrared sensing video cameras, high-definition video cameras, etc.

In an embodiment, the drone 220 may include at least one sensor 224. The sensor 224 may include, but is not limited to, an acoustic sensor (e.g., microphone), a chemical sensor, an infrared sensor, an optical sensor, a collision avoidance sensor (e.g., a proximity sensor), a heat sensor, and/or a vibration sensor, etc. In an embodiment, the sensor 224 may be configured to detect proximity to objects and/or obstacles in the path of the unmanned aerial vehicle 102 for any purpose such as, but not limited to, navigation guidance to the drone 220. The sensor 224 may be configured to determine a distance between the drone 220 and various objects, which may be employed during landing of the drone 220.

The drone 220 may include a transceiver 225 or similarly functioning device(s). In an embodiment, the transceiver 225 may be configured to communicate via transmission medium 221A with domain adaptation system 230. The domain adaptation system 230 may include a processing device, such as a transceiver, to facilitate communications with the drone 220 and vehicle 210.

The transceiver 116, which may include a wireless module, may communicate with the wireless modules of other devices, allowing for the formation of a mesh network. The wireless module may include a low-power wireless transmitter, for example using a wireless protocol such as WirelessHART®, ZigBee®, Bluetooth®, 6LoWPAN, or Wi-Fi®, that connects to the wireless modules of additional devices.

The vehicle 210 includes a video camera 211, a transceiver 212, and a controller 213. The video camera 211 is for taking source domain videos. The transceiver 212 is for transmitting the source domain videos to the video adaptation system 230 via transmission medium 221B. The controller 213 is for controlling the functions of the video camera 211, transceiver, and other elements.

Domain adaptation system 230 is described more fully above with respect to FIG. 1.

While a ground based vehicle is used to capture source domain videos, in other embodiments, the source domain videos can simply be provided by the Internet, a video repository, a video camera and/or any other source. Moreover, while a drone is used to capture target domain videos, in other embodiments, a different entity (person, vehicle, etc.) having a different perspective than the source domain videos can be used.

Figure 3:
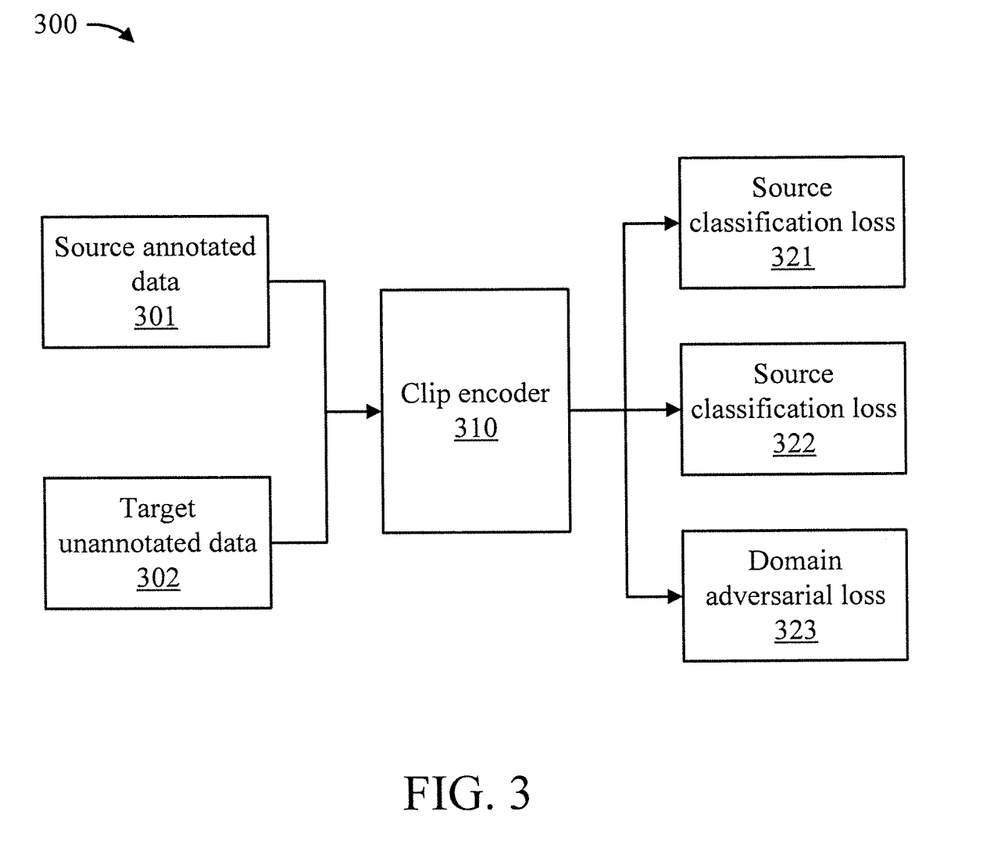
FIG. 3 is a block diagram showing an exemplary clip encoder, in accordance with an embodiment of the present invention.

FIG. 3 is a block diagram showing an exemplary clip encoder 300, in accordance with an embodiment of the present invention.

Embodiments of the present invention work with annotated source examples 301 (e.g., third person videos from the Internet, a ground-based vehicle, a video camera, etc.) along with unannotated target examples 302 (e.g., drone captured videos). The videos are first passed through a CNN denoted as a "clip encoder CNN" 310 in FIG. 3. This clip encoder 320 can be either shared, as shown in the figure, or separate for source and target videos.

The features obtained from the clip encoder CNN 310 are then passed to the following three losses: source classification loss 321, Cross Video Temporal Difference (CVTD) loss 322, and domain adversarial loss 323.

The source classification loss 321 takes the annotated source video clips and optimizes prediction of the classes. Example of source classification loss 321 includes cross entropy loss and per class sigmoid losses.

The domain adversarial loss 323 can be any standard domain adversarial loss. This loss can be used to further improve the performance.

Figure 4:
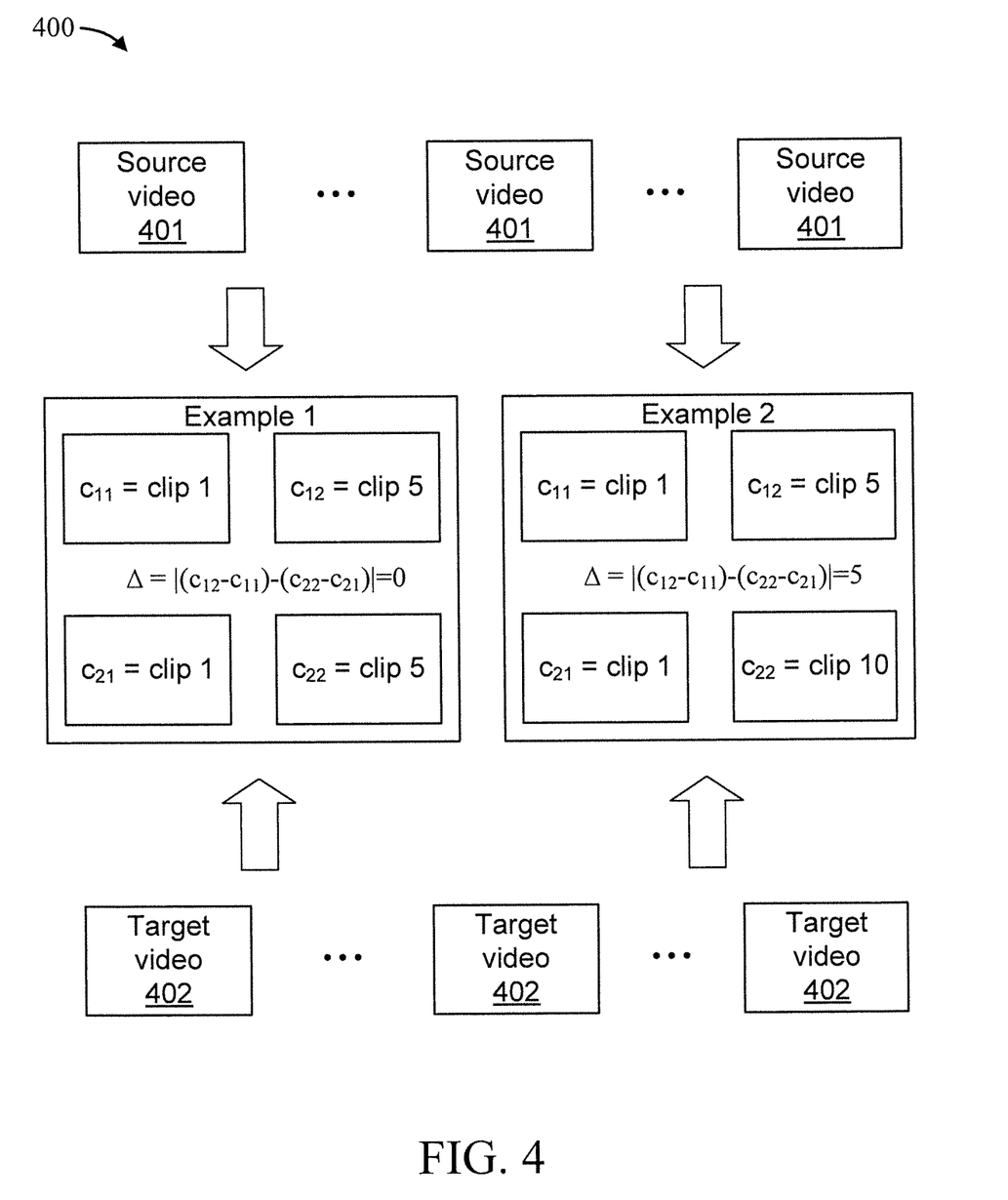
FIG. 4 is a block diagram showing an exemplary scenario involving Cross Video Temporal Difference (CVTD), in accordance with an embodiment of the present invention.

FIG. 4 is a block diagram showing an exemplary scenario 400 involving Cross Video Temporal Difference (CVTD) 322, in accordance with an embodiment of the present invention.

The CVTD loss 322 is calculated using a pair of videos, one each from source and target domains, respectively. In an embodiment, two clips are sampled from each of the videos giving a total of 4 clips. The 4 clips are then passed through the clip encoder CNN 310 and the features obtained are concatenated. The concatenated features are then used to predict the cross-video temporal difference which is defined as follows.

The temporal location of the clip i from video j is denoted $C_{ij}$, i.e., $C_{11}$ is the temporal location of clip 1 from video 1. The temporal locations are quantized by dividing the video into uniform clips. For example, when a video is divided into 10 clips, the clip location can vary from 1 to 10.

The CVTD loss 322 is between a pair of videos, with clips $(C_{11}, C_{12})$ and $(C_{21}, C_{22})$ is computed as:

$$\text{CVTD} = |(c_{12}-c_{11})-(c_{22}-c_{21})|$$

This is illustrated in FIG. 4. In example 1, clip 1 is the first clip and clip 2 is fifth for both videos, in which case the CVTD value is 0. In example 2, the clips are 1 and 5 from video 1 and 1 and 10 from video 2, which gives CVTD=|(10−1)−(5−1)|=5.

The CVTD loss is an L2 loss between predicted CVTD value versus the true CVTD values for the sampled clips.

The way this loss allows for domain adaptation is by tying the domains, by sampling one video from source and another from target. This way the representation has to be descriptive enough to be able to predict the relative temporal difference in clips taken from videos from two different domains.

Thus, if it is presumed that the video representations learned are event based, which capture both the appearance and the temporal location of the clips in the videos (even if implicitly and/or approximately), it can be predicted the relative temporal difference in locations of a pair of clips, i.e. if clip 1 and 5 are input to the system, then the system should output 4. Further, in a domain adaptation system, if there is such event based for both source and target videos, then it can be expected that prediction of relative cross-video temporal difference across the clips of source and target videos should be possible, i.e., if clip 1 and 5 is sampled from source video and clip 1 and 10 are sampled from target video, the system should be able to predict (10−1)−(5−1)=5 in this case as shown above. Now if this is inverted and a system is trained to predict such a temporal difference, then it is hoped that the video representations learned will be event based, which are known to benefit action recognition. Further since the source and target domains videos are tied and the network is learned jointly over videos from both domains, the representation learned should also be largely domain invariant. With this motivation, the present invention works with the CVTD loss.

In addition to the CVTD loss, the full objective includes the source classification loss and the domain adversarial loss. The clip encoder for the source and target video clips shares parameters. The network is optimized end to end for the combined objective.

Figure 5:
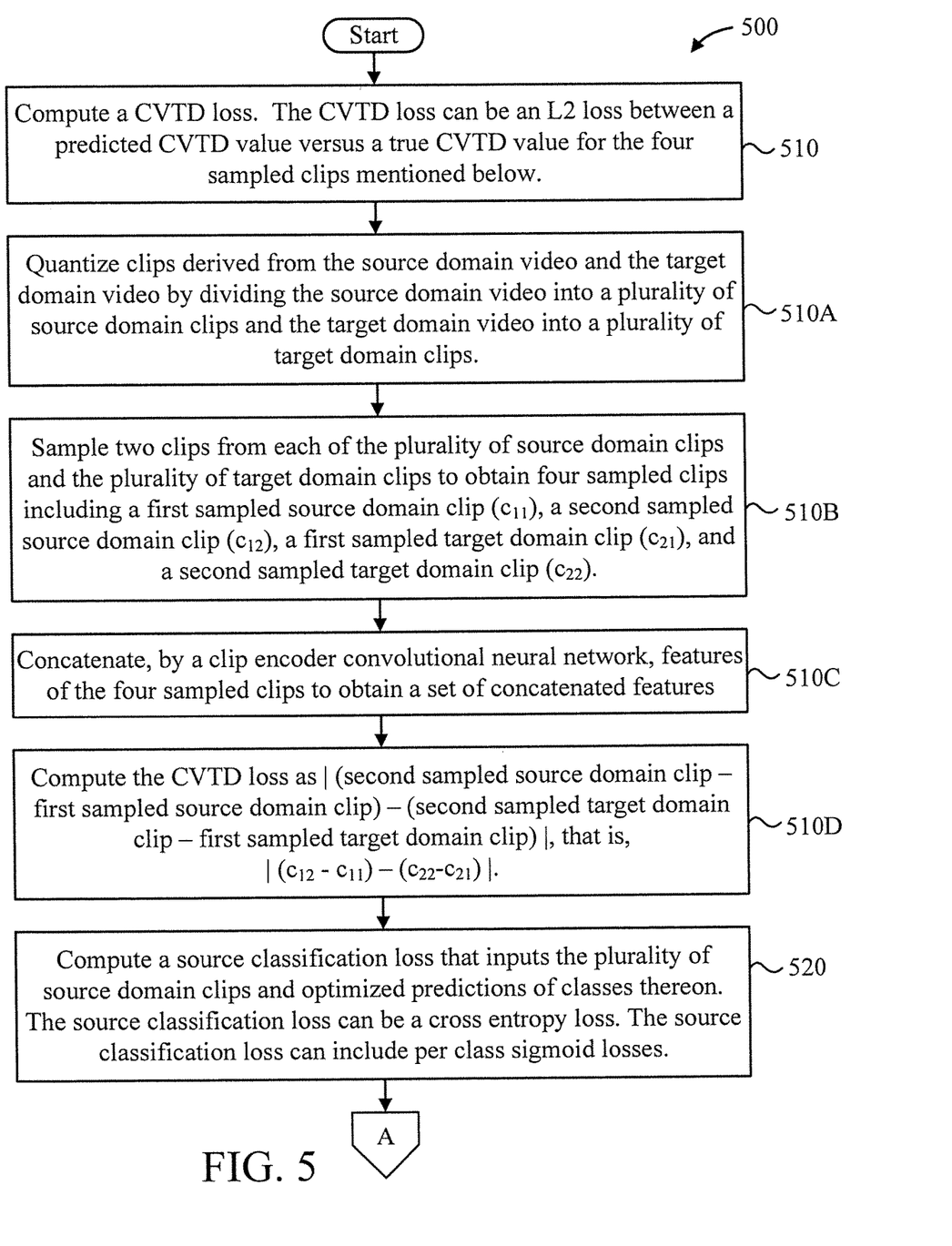
FIGS. 5-6 are block diagrams showing an exemplary method for Cross Video Temporal Difference (CVTD) learning for unsupervised domain adaptation, in accordance with an embodiment of the present invention.
Figure 6:
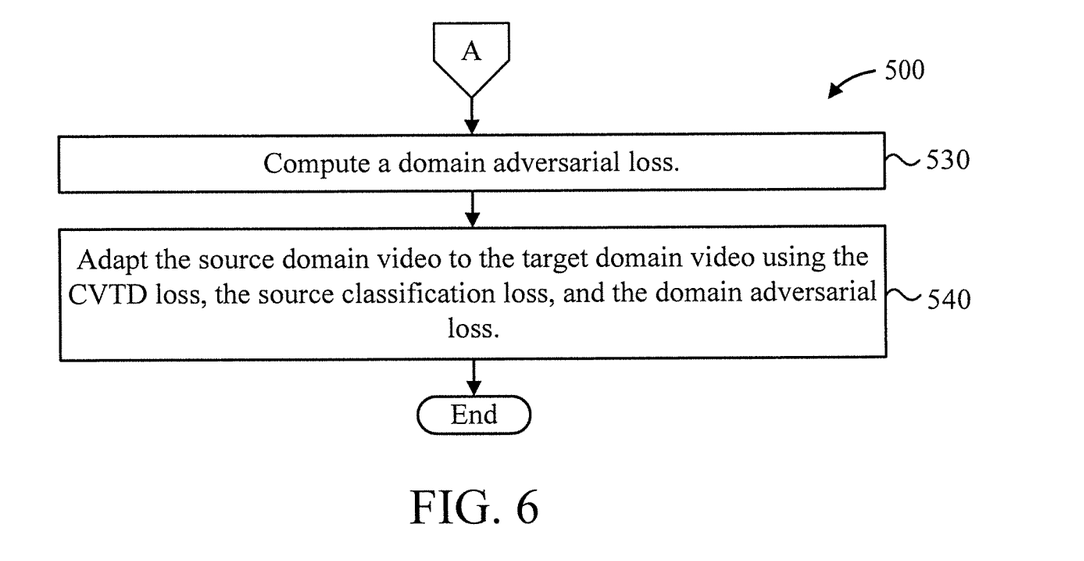

FIGS. 5-6 is a block diagram showing an exemplary method 500 for Cross Video Temporal Difference (CVTD) learning for unsupervised domain adaptation, in accordance with an embodiment of the present invention.

At block 510, compute a CVTD loss. In an embodiment, the CVTD loss can be an L2 loss between a predicted CVTD value versus a true CVTD value for the four sampled clips mentioned below.

In an embodiment, block 510 includes one or more of blocks 510A through 510D.

At block 510A, quantize clips derived from the source domain video and the target domain video by dividing the source domain video into a plurality of source domain clips and the target domain video into a plurality of target domain clips.

At block 510B, sample two clips from each of the plurality of source domain clips and the plurality of target domain clips to obtain four sampled clips including a first sampled source domain clip ($c_{11}$), a second sampled source domain clip ($c_{12}$), a first sampled target domain clip ($c_{21}$), and a second sampled target domain clip ($c_{22}$).

At block 510C, concatenate, by a clip encoder convolutional neural network, features of the four sampled clips to obtain a set of concatenated features used to calculate the CVTD loss.

At block 510D, compute, by the clip encoder convolutional neural network, the CVTD loss as |(second sampled source domain clip−first sampled source domain clip)−(second sampled target domain clip−first sampled target domain clip)|, that is, $|(c_{12}-c_{11})-(c_{22}-c_{21})|$. The features are used as input to the neural network to output the CVTD loss value depending on clip positions.

At block 520, compute a source classification loss that inputs the plurality of source domain clips and optimized predictions of classes thereon. In an embodiment, the source classification loss can be a cross entropy loss. In an embodiment, the source classification loss can include per class sigmoid losses.

At block 530, compute a domain adversarial loss.

At block 540, adapt the source domain video to the target domain video using the CVTD loss, the source classification loss, and the domain adversarial loss.

If the output is correct, then nothing happens. However, if the output does not match, then the learning algorithm adapts the weights of the neural network according to a learning rule. The ground truth here is the calculated CVTD vale from the clip position which is not directly present in the input.

A further description will now be given of various aspects of the present invention.

Embodiments of the present invention provide a novel unsupervised domain adaptation approach for action recognition in videos. A self-supervised task is employed to learn more generalizable representations. FIG. 4 illustrates one aspect of the present invention. The present invention ties the source and target domains by defining a loss on the joint sampling of a pair of videos, one from the source domain and another from the target domain. The task is proposed of predicting the difference between (i) the temporal difference of two clips randomly sampled from a source video and (ii) the temporal difference between two clips randomly sampled from a target video. An intuition is that if a model can predict such differences, then the representations learned by the model would be event-aware, as the temporal evolution of the actions in the videos would depend on events such as 'reaching', 'picking cup', and 'drinking' for 'drinking coffee' action. The event-based representations are expected to be significantly less corrupted by nuisance correlations between the background and the human actions in the source domain, which adversely affect the generalization of the model to the target domain.

Embodiments of the present invention provide a simple and novel self-supervised task for unsupervised domain adaptation for action recognition. It ties the two domains and does not require any external annotations.

Embodiments of the present invention address the unsupervised domain adaptation (UDA) setting for action recognition in videos. There exists (i) annotated source data $(x^s, y^s) \in X^s \times Y^s$, where $X^S$ is the set of videos containing human actions and $Y^s$ is the actions label set over K action classes, encoded as one-hot vectors, and (ii) unannotated target data $x^t \in X^t$. Since the source data distribution, e.g., actions in third-person videos are expected to be considerably different from the target data distribution, e.g., actions in drone-captured videos, the model trained on the source data only, would not work well on target videos. The task is to adapt models to generalize well on the target data, while training with source annotated but target unannotated data.

Figure 7:
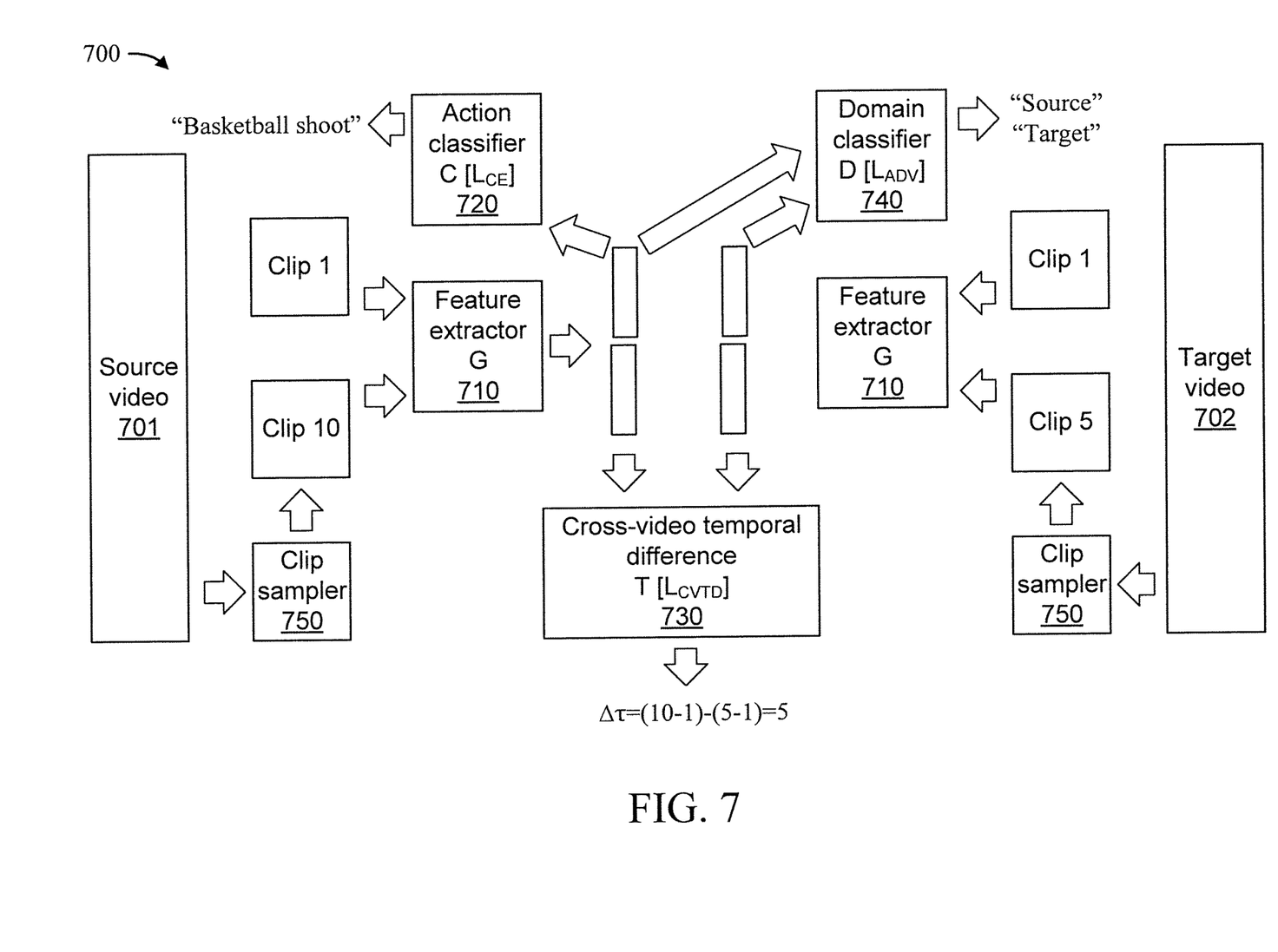
FIG. 7 is a block diagram showing an exemplary system, in accordance with an embodiment of the present invention.

FIG. 7 is a block diagram showing an exemplary system 700, in accordance with an embodiment of the present invention. A goal is learning parameters θ of the feature extractor G 710 so that the learned representations generalize well on the target domain. The present invention randomly samples two clips with length L from the source video 701, and another two clips from the target video 702, using clip samplers 750. While the method can easily work with videos of different lengths, for brevity, it is presumed that the videos have the same length. Clip features for the four sampled clips are extracted using the feature extractor G 710. The extracted features then go through three different sub-networks for (i) action classification C 720, (ii) cross-video temporal difference prediction T 730, and (iii) adversarial domain classification D 740. The input to the action classification network 720 is the source video clips. The present invention trains the action classifier C 720, with parameters φ, and the feature extractor G 710 with the standard cross-entropy loss over the labeled source examples, i.e., $$L_{CE} = -\mathbb{E}_{(x^s, y^s) \sim (X^s, Y^s)} \Sigma_{k=1}^{K} y_k^s \log C_\phi(G_\theta(x^s)).$$

The present invention feeds both source and target clips to the cross-video temporal difference network T 730 and domain classification network D 740, respectively. The cross-video temporal difference network h T 730 helps learns more generalizable feature representations. The adversarial domain classification network D 740 further aligns the source and target domains. The details of those two branches are described hereinafter.

A description will now be given regarding cross-video temporal difference, in accordance with an embodiment of the present invention.

A main contribution is to introduce a novel self-supervised loss, which is called Cross-Video Temporal Difference (CVTD) for video UDA. It is argued for the proposed method with the following inverted logic. If it is presumed that the video representations learned are event-based, which capture both the appearance and the temporal location of the clips in the videos (even if implicitly and/or approximately), it can be expected to be able to predict the relative temporal difference in locations of a pair of clips, i.e., if clip 1 and 5 are input to the system, it should output 4. Further, in a domain adaptation system, if there exists such event-based representations for both source and target videos, then it can be expected that prediction of relative cross-video temporal difference across the clips of source and target videos should be possible. For example, as shown in FIG. 7, if clip 1 and 5 is sampled from a source video and clip 1 and 10 are sampled from a target video, then the system should be able to predict (10−1)−(5−1)=5 in this case. If this logic is inverted and a system is trained to predict such a temporal difference, then it can be hoped that, symmetrically, the video representations learned will be event-based, which are known to beneficial for action recognition. Since a part of the CVTD task is to predict the difference between clips, the learned representations would be focusing on the actual human actions, not be background biased much. Thus, the representations would be domain invariant. Furthermore, the CVTD loss 'ties' two domains by encouraging to predict the difference of difference between clips. Therefore, the source and target features would be more aligned. With this motivation, the present invention works with the CVTD loss.

The CVTD loss is defined as follows:

$$L_{CVTD} = \|\Delta\tau - \Delta\hat{\tau}\|_2^2 = \|(\tau^s - \tau^t) - T_\psi([G_\theta(c_q^s); G_\theta(c_r^t); G_\theta(c_m^t)])\|_2^2.$$

Here, $\tau^s(\tau^t)$ is the ground truth temporal difference between two clips, $c_p^s, c_q^s, (c_r^t, C_m^t)$ sampled in an input video from source (target) domain. The present invention computes $\Delta\tau$ from the clip index information without any external annotations as $\Delta\tau = (t_q^s - t_p^s) - (t_m^t - t_r^s)$, where $t_p^s$ and $t_q^s$ are source clip indices, and $t_r^t$ and $t_m^t$ are target clip indices. T is a neural network with the parameters ψ added on top of the feature extractor G. T gets two clips sampled from a source video, and another two clips from a target video as input and predicts $\Delta\hat{\tau}$, the difference of the time differences of source clips and target clips.

A description will now be given regarding clip sampling by relative importance, in accordance with an embodiment of the present invention.

The mechanism of sampling the clips is crucial for the CVTD task. If the present invention samples only background clips from videos, then the CVTD cannot learn meaningful event-based representations as the sampled clips would not belong to a meaningful event related to the action. e.g., the UCF video where the action is 'golf swing', a man is just standing there in the last two clips. To have clip sampling, which is beneficial for generalizable representation learning, the present invention proposes a relative importance estimation method. The present invention initializes the clip sampling distribution with a uniform distribution. During training, the present invention periodically updates the relative importance of the clips based on the cross-entropy for the source videos, and the entropy of predictions for the target videos (as unlike source, the target labels are not available to calculate cross-entropy). Concretely we use $H_{max}^s - H_i^s$ for the clips from a source video and $S_{max}^t - S_j^t$ for that from a target video, normalized by the softmax function, as the sampling distributions. $H_i^s$ is the cross-entropy and $\S_j^t$ is the entropy defined as follows:

$$H_i^s = -\Sigma_k y_{i,k}^s \log C_\phi(G_\theta(c_i^s));$$

$$s_j^t = -\Sigma_k C_\phi(G_\theta(c_j^t)) \log C_\phi(G_\theta(c_j^t)),$$

where $c_i, c_j$ are the clips and the summation index k varies over all classes. $H_{max}^s$ is the cross-entropy of random chance prediction and $S_{max}^t$ is the entropy of random change prediction for the respective clips. The intuition here being that the clips which make more confident (as well as correct when computable) predictions, i.e., with lower (cross-) entropy, are expected to be important, while clips which predict with higher (cross-) entropy are expected to be noisy and could be background clips. Once the clip importance distributions are updated, the present invention samples clips from each video with the clip importance distribution.

A description will now be given regarding training, in accordance with an embodiment of the present invention.

A description will now be given regarding adversarial domain classification loss.

In addition to the CVTD loss, the present invention can optionally incorporate the adversarial domain classification loss in the full objective. The adversarial domain classification loss is defined as follows, with a domain classifier D with parameters ω:

$$L_{ADV} = -\mathbb{E}_{x^s \sim x^s} \log D_\omega(G(x^s)) - \mathbb{E}_{x^t \sim x^t} \log(1 - D_\omega(G(x^t))).$$

A description will now be given regarding an optimization, in accordance with an embodiment of the present invention.

The present invention optimizes the network end to end for the combined objective. The overall optimization problem is defined as follows:

$$L(\theta, \phi, \psi, \omega) = L_{CE}(\theta, \phi) + L_{CVTD}(\theta, \psi) - \lambda L_{ADV}(\theta, \omega),$$

$$(\theta^*, \phi^*, \psi^*) = \arg\min_{\theta,\phi,\psi} L(\theta, \phi, \psi, \omega^*)$$

$$\omega^* = \arg\max_\omega L(\theta^*, \phi^*, \psi^*, \omega).$$

λ is a hyperparameter for modulating the strength of the domain adversarial loss. The present invention uses the gradient reversal algorithm for adversarial training of domain classifier and feature extractor.

A description will now be given regarding inference, in accordance with an embodiment of the present invention.

The present invention removes the CVTD and adversarial domain classification networks during the inference. The present invention splits the input video into M clips, and feeds them to the feature extractor G and action classifier C to get clip-level action predictions. Then, the present invention late fuses all the clip-level action predictions to get final video-level action predictions, by averaging the final logits for the clips, followed by a softmax.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for Cross Video Temporal Difference (CVTD) learning for unsupervised domain adaptation, comprising:
adapting a source domain video to a target domain video using a CVTD loss, wherein the source domain video is annotated, and the target domain video is unannotated,
wherein the CVTD loss is computed by
quantizing clips derived from the source domain video and the target domain video by dividing the source domain video into a plurality of source domain clips and the target domain video into a plurality of target domain clips;
sampling two clips from each of the plurality of source domain clips and the plurality of target domain clips to obtain four sampled clips comprising a first sampled source domain clip, a second sampled source domain clip, a first sampled target domain clip, and a second sampled target domain clip; and
computing, by a clip encoder convolutional neural network, the CVTD loss as |(second sampled source domain clip−first sampled source domain clip)−(second sampled target domain clip−first sampled target domain clip)|.

2. The computer-implemented method of claim 1, further comprising concatenating, by the clip encoder convolutional neural network, features of the four sampled clips to obtain a set of concatenated features used to calculate the CVTD loss.

3. The computer-implemented method of claim 1, wherein the CVTD loss is an L2 loss between a predicted CVTD value versus a true CVTD value for the four sampled clips.

4. The computer-implemented method of claim 1, wherein the source domain video is adapted to the target domain video further using a source classification loss that inputs the plurality of source domain clips and optimized predictions of classes thereon.

5. The computer-implemented method of claim 4, wherein the source classification loss is a cross entropy loss.

6. The computer-implemented method of claim 4, wherein the source classification loss comprises per class sigmoid losses.

7. The computer-implemented method of claim 1, wherein the source domain video is adapted to the target domain video further using a domain adversarial loss.

8. The computer-implemented method of claim 1, wherein the CVTD loss is applied to learn representations capable of predicting temporal differences between the plurality of source domain clips and the plurality of target domain clips.

9. The computer-implemented method of claim 1, wherein said sampling step samples the two clips from each of the plurality of source domain clips and the plurality of target domain clips to obtain the four sampled clips using importance-based sampling that excludes background only images.

10. The computer-implemented method of claim 9, wherein during training, a relative importance of the pluralities of source and target domain clips are updated based on a cross-entropy of the plurality of source domain videos and an entropy of predictions of the plurality of target domain videos.

11. A computer program product for Cross Video Temporal Difference (CVTD) learning for unsupervised domain adaptation, the computer program product comprising a non-transitory computer readable storage medium having program instructions embodied therewith, the program instructions executable by a computer to cause the computer to perform a method comprising:
adapting a source domain video to a target domain video using a CVTD loss, wherein the source domain video is annotated, and the target domain video is unannotated,
wherein the CVTD loss is computed by
quantizing clips derived from the source domain video and the target domain video by dividing the source domain video into a plurality of source domain clips and the target domain video into a plurality of target domain clips;
sampling two clips from each of the plurality of source domain clips and the plurality of target domain clips to obtain four sampled clips comprising a first sampled source domain clip, a second sampled source domain clip, a first sampled target domain clip, and a second sampled target domain clip; and
computing, by a clip encoder convolutional neural network, the CVTD loss as |(second sampled source domain clip−first sampled source domain clip)−(second sampled target domain clip−first sampled target domain clip)|.

12. The computer program product of claim 11, wherein the method further comprises concatenating, by the clip encoder convolutional neural network, features of the four sampled clips to obtain a set of concatenated features used to calculate the CVTD loss.

13. The computer program product of claim 11, wherein the CVTD loss is an L2 loss between a predicted CVTD value versus a true CVTD value for the four sampled clips.

14. The computer program product of claim 11, wherein the source domain video is adapted to the target domain video further using a source classification loss that inputs the plurality of source domain clips and optimized predictions of classes thereon.

15. The computer program product of claim 14, wherein the source classification loss is a cross entropy loss.

16. The computer program product of claim 14, wherein the source classification loss comprises per class sigmoid losses.

17. The computer program product of claim 11, wherein the source domain video is adapted to the target domain video further using a domain adversarial loss.

18. The computer program product of claim 11, wherein the CVTD loss is applied to learn representations capable of predicting temporal differences between the plurality of source domain clips and the plurality of target domain clips.

19. The computer program product of claim 11, wherein said sampling step samples the two clips from each of the plurality of source domain clips and the plurality of target domain clips to obtain the four sampled clips using importance-based sampling that excludes background only images.

20. A computer processing system for Cross Video Temporal Difference (CVTD) learning for unsupervised domain adaptation, comprising:
  a memory device for storing program code; and
  a hardware processor operatively coupled to the memory device for running the program code to adapt a source domain video to a target domain video using a CVTD loss, wherein the source domain video is annotated, and the target domain video is unannotated,
  wherein the hardware processor computes the CVTD loss by quantizing clips derived from the source domain video and the target domain video by dividing the source domain video into a plurality of source domain clips and the target domain video into a plurality of target domain clips;

sampling two clips from each of the plurality of source domain clips and the plurality of target domain clips to obtain four sampled clips comprising a first sampled source domain clip, a second sampled source domain clip, a first sampled target domain clip, and a second sampled target domain clip; and computing, using a clip encoder convolutional neural network, the CVTD loss as |(second sampled source domain clip−first sampled source domain clip)−(second sampled target domain clip−first sampled target domain clip)|.

* * * * *